US007674532B2

(12) United States Patent
Einhorn et al.

(10) Patent No.: US 7,674,532 B2
(45) Date of Patent: Mar. 9, 2010

(54) SECURITY TAGGANTS IN ADHESIVE PLASTIC FILM LAMINATE FOR PHARMACEUTICAL PACKAGING

(75) Inventors: Richard A. Einhorn, Albuquerque, NM (US); Eric J. Rainal, Morristown, NJ (US); Karl J. Smith, Sparta, NJ (US); Yuan-Ping R. Ting, Plainsboro, NJ (US); Michael Jablon, Ramsey, NJ (US); Gerald A. Smith, Easton, PA (US)

(73) Assignee: Honeywell International Inc, Morristown, NJ (US)

( * ) Notice: Subject to any disclaimer, the term of this patent is extended or adjusted under 35 U.S.C. 154(b) by 706 days.

(21) Appl. No.: 10/893,854

(22) Filed: Jul. 19, 2004

(65) Prior Publication Data

US 2006/0014045 A1    Jan. 19, 2006

(51) Int. Cl.
*B32B 9/00* (2006.01)
*C09K 11/00* (2006.01)
(52) U.S. Cl. .............. 428/690; 428/195.1; 428/421; 428/422; 252/301.16; 252/301.35; 264/21; 156/67
(58) Field of Classification Search .......... 428/690, 428/421, 422, 195.1; 252/301.16, 301.35
See application file for complete search history.

(56) References Cited

U.S. PATENT DOCUMENTS 5,243,457 A * 9/1993 Spencer ................ 119/795
5,424,006 A    6/1995 Murayama et al. ........ 252/301.4
5,674,437 A    10/1997 Geisel .................... 264/21
5,885,677 A    3/1999 Gosselin et al. ........... 428/40.1
5,932,309 A    8/1999 Smith et al. ............... 428/46
6,165,609 A    12/2000 Curatolo .................. 428/343
6,555,190 B1 * 4/2003 Tsai ....................... 428/36.6
7,211,308 B2 * 5/2007 Rhee et al ................ 428/36.91
2002/0160188 A1   10/2002 Tam et al. ................. 428/397
2003/0194578 A1   10/2003 Tam et al. ................. 428/690
2003/0203146 A1 * 10/2003 Nakanishi ................. 428/40.1
2003/0203212 A1   10/2003 Wei et al.
2003/0203416 A1 * 10/2003 Staudt et al. .............. 435/7.23
2004/0202850 A1 * 10/2004 Hayashi et al. ............ 428/212
2004/0247832 A1   12/2004 Koops et al.

FOREIGN PATENT DOCUMENTS

GB    2338679    12/1999
WO    WO 03/046866 A    6/2003

* cited by examiner

*Primary Examiner*—D. Lawrence Tarazano
*Assistant Examiner*—Camie S Thompson
(74) *Attorney, Agent, or Firm*—Carrie Beaths

(57) ABSTRACT

Security films that are useful for pharmaceutical packaging. In particular, anti-counterfeiting security films having a luminescent composition on or in a fluoropolymer layer, which luminescent composition luminesces upon the application of ultraviolet radiation in the 200 nm to 300 nm range, in which the luminescent component is optionally and preferably not viewable to the unaided eye. The films are particularly useful for the formation of anti-counterfeiting blister packaging in compliance with FDA regulations.

53 Claims, No Drawings

SECURITY TAGGANTS IN ADHESIVE PLASTIC FILM LAMINATE FOR PHARMACEUTICAL PACKAGING

BACKGROUND OF THE INVENTION

1. Field of the Invention

The invention relates to security films that are useful for anti-counterfeiting, such as may be employed in pharmaceutical packaging. In particular, the invention pertains to security films and articles having a luminescent composition on or in a polymeric layer that luminesces upon the application of ultraviolet radiation in the 200 nm to 300 nm range, in which the luminescent component is optionally and preferably not viewable to the unaided eye.

2. Description of the Related Art

Product packaging, including labels or tags on products, serve many functions for both manufacturers and consumers. For a manufacturer, one function of product packaging is for advertising. For a consumer, it provides valuable information that helps in the buying decision. As a mutual benefit, product packaging also may serve to protect the product from destructive elements in its surrounding environment. Some product packaging is also used for the additional purpose of ensuring identification and authentication of a product, and protection against product counterfeiting. Today, the counterfeiting of consumer products is a common problem that plagues governments and manufacturers around the world. This is particularly a problem in the pharmaceutical industry, where drug counterfeiters not only defraud consumers, they also deny ill patients the therapies that can alleviate suffering and save lives.

According to the federal Food and Drug Administration (FDA), there has been a recent increase in counterfeiting activities as well as increased sophistication in the methods used to introduce finished dosage form counterfeits into the otherwise legitimate U.S. drug distribution system. FDA counterfeit drug investigations have involved well-organized criminal operations that seek to introduce finished drug products that may closely resemble legitimate drugs yet may contain only inactive ingredients, incorrect ingredients, improper dosages, sub-potent or super-potent ingredients, or be contaminated. Therefore, drug counterfeiting poses real public health and safety concerns today, and may pose an even greater threat in the future. As counterfeiters continue to seek out new technologies to make deceptive products and introduce them into legitimate commerce, systems for protecting patients must respond effectively.

While improvement of the security of consumer products is a recognized need, particularly in the pharmaceutical industry, pharmaceutical companies are often limited due to FDA packaging requirements and the lack of security in current printing operations for the outside package. In a preferred solution, an anti-counterfeiting taggant may be introduced in secure pill production/packaging lines, being placed as close as possible to the drug. However, proximity of taggants to the drug may be restricted by FDA requirements to placement of an impervious plastic film barrier between the taggant and the drug.

Recent advances in the art of security films and articles are described in commonly assigned U.S. patent applications 2003/0194578 and 2002/0160188, which are incorporated herein by reference in their entireties. Application 2003/0194578 teaches security articles comprising elements such as filaments, fibers, including hollow fibers, and threads and thin transverse sections and chopped versions thereof, wherein such elements are dispersed within the articles. Particle scattering and luminescent technology is employed based on scattering, electronic, magnetic and/or light properties to provide compound physical coloration responsive to various portions of the electromagnetic spectrum, including ultraviolet, ambient and infrared. Application 2002/0160188 teaches security articles comprising fibers, threads and fiber sections ("dots") possessing multiple verification characteristics. The fibers possess unique and difficulty duplicated combinations of complex cross-sections, components, and multiple luminescent responses, and has many verifiable characteristics of the security fibers, threads, and dots that provide high levels of protection against fraudulent duplication of articles in which they are incorporated.

A significant advance in the production of color in articles, including fibers, threads and film, is disclosed in commonly assigned U.S. Pat. No. 5,932,309, which is incorporated herein by reference in its entirety. To achieve coloration, U.S. Pat. No. 5,932,309 utilizes particle scattering effects and/or electronic transition colorants, as defined in the patent. The resulting coloration in an article can be highly stable or responsive to switching effects of, e.g., temperature, thermal exposure, moisture absorption and exposure to actinic radiation. Other efforts include U.S. Pat. No. 6,165,609 which describes labels having a security coating on a substrate that is not transparent to ultraviolet radiation in the 200 nm to 300 nm range. Also, U.S. Pat. No. 5,885,677, et al. describes security labels having a diffusing identifier medium, but also does not teach a substrate that is transparent to radiation in the 200 nm to 300 nm range.

The present invention provides an improved anti-counterfeiting process and construction compared to the related art. The construction of the invention isolates one or more taggants from a product either by placing the taggants between two film layers or by blending the taggants within a polymeric film layer, thus minimizing FDA issues of taggant contact with drugs. Further, the construction of the invention provides improved security by containing one or more taggants that are visible only when exposed to invisible light, or potentially a construction whereby luminescent emissions could also be outside the visible light spectrum, requiring specialized detection equipment. It has been found that Aclar®, a clear fluoropolymer material manufactured by Honeywell International Inc. of Morristown, N.J., is an excellent pharmaceutical packaging material and is unique in that it is transparent to short UV light, i.e. radiation in the 200 nm to 300 nm range, whereas other clear packaging materials are not. Accordingly, security films and articles incorporating Aclar® have been found to be exceptionally effective.

SUMMARY OF THE INVENTION

The invention provides a film comprising either i) or ii):
i) a polymer layer containing a luminescent component therein, which luminescent component luminesces upon the application of ultraviolet radiation in the 200 nm to 300 nm range onto the luminescent component; which polymer layer has a transparency to ultraviolet radiation in the 200 nm to 300 nm range in an amount of about 10% or more;
ii) a) a polymer layer, which polymer layer has a transparency to ultraviolet radiation in the 200 nm to 300 nm range in an amount of about 10% or more; and
b) a luminescent component on the polymer layer, which luminescent component luminesces upon the application of ultraviolet radiation in the 200 nm to 300 nm range onto the luminescent component.

The invention also provides a process for forming a film comprising:

a) forming a blend of a luminescent component and a polymer, which luminescent component luminesces upon the application of ultraviolet radiation in the 200 nm to 300 nm range onto the luminescent component; and b) forming the blend into a polymer layer which polymer layer has a transparency to ultraviolet radiation in the 200 nm to 300 nm range in an amount of about 10% or more.

The invention further provides a process for forming a film comprising applying a luminescent component onto a polymer layer, wherein said polymer layer has a transparency to ultraviolet radiation in the 200 nm to 300 nm range in an amount of about 10% or more, and wherein said luminescent component luminesces upon the application of ultraviolet radiation in the 200 nm to 300 nm range onto the luminescent component.

The invention still further provides an article comprising a multilayered film comprising either i) or ii):

i) a fluoropolymer layer containing a luminescent component therein, which luminescent component luminesces upon the application of ultraviolet radiation in the 200 nm to 300 nm range onto the luminescent component; which fluoropolymer layer has a transparency to ultraviolet radiation in the 200 nm to 300 nm range in an amount of about 10% or more;

ii) a) a fluoropolymer layer, which fluoropolymer layer has a transparency to ultraviolet radiation in the 200 nm to 300 nm range in an amount of about 10% or more; and b) a luminescent component on the fluoropolymer layer, which luminescent component luminesces upon the application of ultraviolet radiation in the 200 nm to 300 nm range onto the luminescent component; and iii) a receiver layer attached to said fluoropolymer layer.

The invention still further provides a method for authenticating an article comprising:

I. providing an article comprising a multilayered film comprising either i) or ii):

i) a fluoropolymer layer containing a luminescent component therein, which luminescent component luminesces upon the application of ultraviolet radiation in the 200 nm to 300 nm range onto the luminescent component; which fluoropolymer layer has a transparency to ultraviolet radiation in the 200 nm to 300 nm range in an amount of about 10% or more;

ii) a) a fluoropolymer layer, which fluoropolymer layer has a transparency to ultraviolet radiation in the 200 nm to 300 nm range in an amount of about 10% or more; and b) a luminescent component on the fluoropolymer layer, which luminescent component luminesces upon the application of ultraviolet radiation in the 200 nm to 300 nm range onto the luminescent component; and iii) a receiver layer attached to said fluoropolymer layer.

II) applying ultraviolet radiation in the 200 nm to 300 nm range onto the luminescent component;

III) determining a luminescent response resulting from the applying of ultraviolet radiation;

IV) optionally comparing the luminescent response determined from step III) to a standard luminescent response.

The invention still further provides a process for forming a film comprising applying a luminescent component onto a receiver layer, wherein said luminescent component luminesces upon the application of ultraviolet radiation in the 200 nm to 300 nm range onto the luminescent component, and then attaching a polymer layer to the receiver layer such that said luminescent component is positioned between said polymer layer and said receiver layer, wherein the polymer layer has a transparency to ultraviolet radiation in the 200 nm to 300 nm range in an amount of about 10% or more.

DETAILED DESCRIPTION OF THE INVENTION

The present invention provides anti-counterfeiting security films and articles formed therefrom, and also processes for their formation. The films include one or more luminescent taggant components that are well known in the art, which luminescent component or components luminesce upon the application of ultraviolet radiation in the 200 nanometer (nm) to 300 nm wavelength range onto the luminescent component. In one embodiment, the luminescent composition may be printed or otherwise applied onto a polymer layer, which polymer layer has a transparency to ultraviolet radiation in the 200 nm to 300 nm range in an amount of about 10% or more. Alternately, a film is provided that comprises such a polymer layer containing a luminescent component therein. For example, the luminescent composition may be pre-blended with the polymer layer, followed by extruding, casting, blowing or otherwise forming a layer from the blend.

In the preferred embodiment of the invention, the polymer layer which has a transparency to ultraviolet radiation in the 200 nm to 300 nm range in an amount of about 10% or more comprises a fluoropolymer. Preferred fluoropolymers include homopolymers, copolymers and blends thereof as are well known in the art and are described in, for example, U.S. Pat. Nos. 4,510,301; 4,544,721; and 5,139,878. Of these, particularly preferred fluoropolymers include homopolymers and copolymers of chlorotrifluoroethylene, ethylene-tetrafluoroethylene copolymer, fluorinated ethylene-propylene copolymer, perfluoroalkoxyethylene, polychlorotrifluoroethylene, polytetrafluoroethylene, polyvinyl fluoride, polyvinylidene fluoride, and copolymers and blends thereof. As used herein, copolymers include polymers having two or more monomer components. Most preferred are chlorotrifluoroethylene homopolymers or chlorotrifluoroethylene containing copolymers. Such are available as ACLON® resin from Honeywell International Inc. of Morristown, N.J., which is also available from Honeywell International Inc. as ACLAR® films. Aclar® PCTFE fluoropolymer films are crystal clear, chemically stable, biochemically inert films that provide an excellent moisture for a clean, thermoformable film. They are plasticizer and stabilizer free, and provide up to 10 times the barrier of other transparent blister packaging films. Aclar® PCTFE fluoropolymer films also exhibit antistatic, and excellent electrical properties, can be laminated and metallized and are preferred by pharmaceutical companies for blister packaging and other health care packaging.

As previously described, the polymer layer of the invention has a transparency to ultraviolet radiation in the 200 nm to 300 nm range in an amount of about 10% or more. More preferably, polymer layer has a transparency to ultraviolet radiation in the 200 nm to 300 nm wavelength range in an amount of about 70% or greater, even more preferably in an amount of about 80% or greater, still more preferably in an amount of about 90% percent or greater and most preferably has a transparency to such short wavelength ultraviolet radiation in an amount of about 99% or greater.

The luminescent component of the invention comprises a short wavelength ultraviolet radiation activated, visible light fluorescing or phosphorescing composition. For the purposes of the invention, the short ultraviolet spectrum is taken to lie in the region of 200 nm to 300 nm, and the long ultraviolet spectrum is taken to begin at wavelengths greater than 300 nm to about 400 nm. The visible spectrum is taken to lie in the wavelength region of about 400 to about 700 nm. The near infra-red spectrum is taken to begin at wavelengths greater than about 700 nm and may be taken to end at 3000 nm. The luminescent component is preferably also capable of multiple luminescent responses, such as described in commonly assigned U.S. patent application publication No. 2002/0160188, which is incorporated herein by reference. For purposes of the present invention, luminescent responses or luminescence includes both fluorescence and phosphorescence. The luminescent responses are selected from the group consisting of phosphorescence or fluorescence. The luminescent responses of the luminescent compositions of the invention (also known as taggants) include wavelengths in the short ultraviolet regions of the spectrum. The films and structures of the invention may contain a plurality of different taggants, each preferably activated by ultraviolet radiation in the 200 nm to 300 nm range at distinctly different wavelengths, and potentially emitting a luminescent response at a variety of visible wavelengths, including non-visible wavelengths that require specialized detection equipment.

The luminescent component of the invention may comprise one or more luminescent copolymers, pigments or dyes that are commercially available, such as, for example, pigments available from the Lumilux® family of pigments from Honeywell International, Inc. Luminescent pigments or dyes may be organic, inorganic or organometallic substances. Examples of thermally stable organic substances useful in the present invention are the compounds 4,4'-bis(2 methoxy-styryl)-1,1'-biphenyl, 4,4'-bis(benzoaxazol-2-yl)stilbene, and 2,5-thiophenediylbis(5-tert-butyl-1,3-benzoxazole). Examples are compounds are sold commercially by Ciba Specialty Chemicals Inc. under the trade names UVITEX® FP, UVITEX® OB-ONE, and UVITEX® OB; and by Honeywell Specialty Chemicals under the tradename Lumilux® Effect Light Blue CO. These compounds, when excited by ultraviolet radiation, fluoresce in the ultraviolet and visible regions of the spectrum.

Examples of inorganic substances useful in the present invention are $La_2O_2S$:Eu, $ZnSiO_4$:Mn, and $YVO_4$:Nd. These materials are sold commercially by Honeywell Specialty Chemicals under the trade names LUMILUX® Red CD 168, LUMILUX® Green CD 145 and LUMILUX® IR-DC 139, respectively. Each is excited by ultraviolet radiation. LUMILUX® Red CD 168 and LUMILUX® Green CD 145 fluoresce in the visible and LUMILUX® IR-DC139 fluoresces in the infrared. Another useful substance is a rare earth oxysulfide sold commercially by Honeywell Specialty Chemicals under the trade name LUMILUX® Red UC 6. This material is excited by infrared radiation and fluoresces in the visible. Additionally, several zinc sulfide compounds doped with, e.g., silver, copper, aluminum or manganese are also sold commercially by Honeywell Specialty Chemicals. Several of these products are excited by UV and white light and respond with both fluorescence and phosphorescence and also are characterized as having the property of a long afterglow (Lumilux® Green N5, N-PM and N2); others are excited by UV radiation and fluoresce in colors including blue, green, red, yellow and yellow-orange (Lumilux® Effect: Blue A, Green A, Red A, Blue CO, Green CO Yellow CO and Yellow-Orange); still others are excited by UV and white light and display fluorescence and phosphorescence (Lumilux® Effect Blue SN and Blue SN-F, alkaline earth silicates; Lumilux®Effect: Green N, Breen N-L, Green N-E, Green N-F, Green N-3F, Green N-FG, Green N-FF), and Green SN-F5, a strontium aluminate compound doped with europium and dysprosium; and Lumilux® Effect Red N 100, a calcium sulfide compound doped with europium and thulium, that is activated by white light and responds with red fluorescence and phosphorescence. Mixtures of such materials can also be used and some mixtures are available commercially (Lumilux® Effect Sipi: Yellow and Red).

Particularly useful are all the luminescent compositions that are described in both U.S. patent application and 2002/0160188 and 2003/0194578 to Tam et al. which are commonly assigned and incorporated herein by reference. Also particularly preferred are those described in the Examples below, such as Lumilux® Red CD380, which is a short wavelength ultraviolet radiation activated, visible light fluorescing taggant, Lumilux®Yellow CD 382, a long and (weakly) short wavelength UV activated fluorescent Salicylic acid derivative pigment, and Lumilux® Red CD 740, a long and (weakly) short wavelength UV activated fluorescent oxinate pigment. As discussed in the Examples, a taggant like Lumilux® Red CD380 may optionally be employed in combination with additional visible fluorescing taggants activated by long wavelength ultraviolet radiation, such as Lumilux® CD 797 or CD 997, and/or activated by infrared radiation, such as Lumilux® Green UC 2. The wavelengths of the fluorescent or phosphorescent emissions may be varied by altering the chemical identities of the individual taggants.

Typically, the luminescent effect may be a fluorescent effect observable only during the time when the excitation source is present or within less than a second thereafter. Alternately, it may be a phosphorescent effect observable for a short time after the activating light energy is terminated, such effect referred to herein as "afterglow". Such periods of afterglow can be from greater than about 10 minutes and up to about 200 minutes or longer; for example, from about 15 minutes to about 120 minutes; or from about 15 minutes to about 60 minutes. U.S. Pat. Nos. 5,424,006 and 5,674,437 describe a particular class of phosphorescent substances, and methods for their manufacture, that have long afterglow qualities and are useful in the security articles of the present invention since the rate of decay of luminescence can be used as one of the verifiable features of such articles. These patents are incorporated herein by reference. U.S. Pat. No. 5,674,437 discloses incorporating such materials in fibers. The phosphorescent substances are generally described as doped metal aluminate oxide pigments, wherein the metal can be, e.g., calcium, strontium, barium or mixtures thereof and the dopants are preferably europium and an element selected from the group consisting of elements of the Lanthanide series of the Periodic Table of the Elements including lanthanum, cerium, praseodymium, neodymium, samarium, gadolinum, dysprysium, holmium, erbium, thulium, ytterbium and lutetium, and tin and bismuth. An example is $SrAl_2O_4$:Eu Dy, as described in U.S. Pat. No. 5,424,006; such pigments are available under the tradename Lumilux® available from Honeywell International Inc.

A luminescent component or pigment is preferably combined with a suitable solvent or binder prior to being applied onto a polymer layer of the invention. Suitable solvents include polar and non-polar solvents. Suitable binders include a wide range of solvent based and aqueous adhesives. Such adhesives include polyurethanes, epoxies, polyesters, acrylics, anhydride modified polyolefin and blends thereof. Modified polyolefin compositions have at least one functional moiety selected from the group consisting of unsaturated polycarboxylic acids and anhydrides thereof. Such unsaturated carboxylic acid and anhydrides include maleic acid and anhydride, fumaric acid and anhydride, crotonic acid and anhydride, citraconic acid and anhydride, itaconic acid and anhydride and the like. Suitable solvents include alcohols, esters, ketones, halogen containing organic solvents and hydrocarbon solvents. The pigment may also be dispersed in a binding polymer matrix as is well known in the art. The pigment and binder or solvent may be combined using common mixing or blending techniques to form the luminescent composition. The composition may then be coated onto the polymer layer using well known coating techniques. Suitable coating methods include dip coating, meniscus coating, roller coating, doctor blade coating, and the like which are well known in the art. Alternately, the luminescent composition may be applied in the form of a pattern or patterned indicia as a added security feature. Such patterns include printed words and images. If dispersed in an appropriate binder, the luminescent composition may also be formed into a film, such as by using known extrusion techniques. It should be understood that while the process of the invention has heretofore been described with reference to applying the luminescent composition of the invention onto the polymer layer of the invention which has a transparency to ultraviolet radiation in the 200 nm to 300 nm range in an amount of about 10% or more, it is also within the scope of the invention that the luminescent composition may first be applied onto a receiver layer, followed by attaching a polymer layer as discussed herein to the receiver layer, such that the luminescent composition is positioned between the receiver layer and the polymer layer.

The luminescent substances together with a suitable binder are used in concentrations suitable for obtaining a desired luminescent effect. Depending on the particular end use or article for which security characteristics are desired, it may be desirable to use a mixture of fluorescent and phosphorescent substances or it may be desired to use solely a fluorescent substance or mixture of fluorescent substances or solely a phosphorescent substance or mixture of phosphorescent substances. The minimum concentration of luminescent substances in a binder is preferably at least about 0.05 weight percent, more preferably at least about 0.10 weight percent, still more preferably about 0.50 weight percent. Conversely, the maximum concentration of one or more luminescent substances will be determined by the application, the physical properties of the article that need to be achieved, e.g. ease of fabrication, cost considerations, etc. The maximum concentration of luminescent substances in the binder is preferably about 85 weight percent, more preferably about 50 weight percent, still more preferably about 25 weight percent, still more preferably a maximum of about 20 weight percent. A typical luminescent composition concentration comprises no more than about 10 weight percent compared to the overall weight of its binder composition.

The polymer layer of the invention, which polymer layer either has the luminescent component on it or in it, is preferably attached to at least one receiver layer. The receiver layer may serve many purposes, but generally serves as a barrier isolating the taggant (luminescent component) and preventing contact of the luminescent component with a consumer product. Accordingly, the receiver layer is preferably attached to the polymer layer whereby the luminescent component is positioned between the polymer layer and the receiver layer. Should the luminescent component be blended within the polymer layer, articles formed therefrom should be formed such that a product will not come into contact with that blended layer. It is within the scope of the invention that multiple receiver layers may be attached to the polymer layer and to each other so long as the transparency of the overall film is sufficient to irradiate the luminescent component with ultraviolet radiation in the 200 nm to 300 nm range resulting in a visible luminescent response.

Suitable receiver layers non-exclusively include those formed from polyolefins including polyethylenes and cyclic olefin copolymers, polyamides, ethylene vinyl acetate copolymers, ethylene vinyl alcohol copolymers, polyesters such as polyethylene terephthalate, polyvinyl chloride, polyvinylidene chloride, polystyrene, styrenic copolymers, polyisoprene, polyurethanes, ethylene ethyl acrylate, ethylene acrylic acid copolymers, fluoropolymers, polyacrylics, polyalcohols, polyethers, polyketones, polycarbonates, polysulfides, cellulosic and polyvinyl derivatives and blends of the foregoing materials. Suitable receiver layers also include non-polymer layers such as metal foils, e.g. aluminum foil, or paper or cardboard as is known in the art. In the most preferred embodiment of the invention, the luminescent component is activated by light to which only the polymer layer or receiver layer in the film structure is transparent, e.g. Aclar®. In other words, the films of the invention are constructed with materials allowing visible or other identification by exposure to invisible light with at least one of the taggants through only one side of the construction, and allows visible or other identification with one or more additional taggants through both sides of the construction. This special feature adds additional security to films of the invention. Most preferably, the receiver layer comprises polyvinyl chloride. Polyvinyl chloride (PVC) is typically used as the other plastic laminate layer, providing compatibility with heat sealants typically used to fuse a foil construction with a plastic laminate in drug-containing blister pack constructions, as is well known in the art. The polymeric layer and receiver layer, and optionally the luminescent composition (if present in a suitable binder, such as a polymeric adhesive) may be attached by coextrusion or lamination techniques that are well known in the art. In one preferred embodiment of the invention, the polymer layer and receiver layer are attached by lamination via an adhesive composition that contains the luminescent composition of the invention.

Although each layer of the film structure of the invention may have a different thickness, the thickness of each of the polymer layer and receiver layer is preferably from about 1 µm to about 500 µm, more preferably from about 3 µm to about 375 µm, and most preferably from about 50 µm to about 250 µm. The thickness of the polymer layer is preferably within this thickness range whether or not the luminescent composition is blended therein. Any adhesive layers, including an adhesive layer containing the luminescent composition of the invention, also has a preferred thickness of about 1 µm to about 25 µm, more preferably from about 3 µm to about 8 µm and most preferably from about 4 µm to about 6 µm. The thickness of the overall film of the invention preferably ranges from about 1 µm to about 500 µm, more preferably from about 3 µm to about 375 µm, and most preferably from about 50 µm to about 250 µm. While such thicknesses are preferred, it is to be understood that other film preferred, it is to be understood that other film thicknesses may be produced to satisfy a particular need and yet fall within the scope of the present invention.

Preferably the individual film layers or the overall film is either monoaxially or biaxially oriented. Preferably, in the present invention the film is oriented to a draw ratio of from 1.5:1 to 5:1 uniaxially in at least one direction, i.e. its longitudinal direction, its transverse direction or biaxially in each of its longitudinal and transverse directions. For the purposes of the present invention the term draw ratio is an indication of the increase in the dimension in the direction of draw. Preferably, the film or at least one of the polymer layer or receiver layer is simultaneously biaxially oriented, for example orienting a plasticized film in both the machine and transverse directions at the same. This has been found to result in dramatic improvements in clarity, strength and toughness properties.

As discussed herein, the films of the invention are particularly useful for forming shaped packaging articles having security features, such as blister packages used for packaging pharmaceutical products. It should, however, be understood that the films of the invention may also be used for forming other articles including labels and identification documents such as passports and laminated identification cards, currency and banknotes, negotiable instruments, stocks and bonds, licenses including drivers' licenses, diplomas, credit and debit cards, security identification cards, automatic teller machine (ATM) or banking access cards, and other important documents or shaped articles and containers for which anti-counterfeiting or other security or information features are desirable.

The presence or absence of a luminescent composition or taggant in a security film or article is determined by an appropriate activation and detection system, including artificially manufactured activators and detectors, and/or artificially manufactured activators and natural detection methods by visual observation of effects resulting from the activation. The identity of the construction prepared as described above may be confirmed by observing the existence and color of emitted fluorescent light upon irradiation of the construction alternately on each side of the laminate with a selection of irradiating wavelengths determined by the optimum excitation wavelength of each fluorescent taggant. For example, a typical laboratory UV lamp can be set to emit at short, medium and long wavelength UV, e.g., 254, 302 and 365 nanometers, respectively. Exposure of a tagged adhesive in an Aclar®/PVC laminate with 254 nm excitation would activate a Lumilux® CD 380 taggant to emit visible fluorescent red light, viewable only through the Aclar® side of the laminate. Exposure with 365 nm light would activate a Lumilux® CD 797 or CD 997 taggant to emit yellow light, visible through both sides of the laminate. Exposure with a near infrared hand-held laser, emitting at about 980 nm, would activate a Lumilux® UC-2 taggant to emit fluorescent green light, visible through both sides of the laminate. Methods of detecting taggant compounds and detecting devices are known and described, for example, in U.S. Pat. Nos. 5,719,948; 5,714, 291; 5,666,417; 5,605,738; 5,574,790; 5,548,106; 5,418,855; 5,414,258; 4,642,526; 4,146,792; 3,164,603; 3,162,642; and 3,066,105. For the purposes of the invention, an appropriate detector is one that is at least capable of applying short wavelength ultraviolet radiation in the 200-300 nm range to the claimed luminescent component of the invention.

In use, one forms the multilayered film article as described above. An article is tested for authenticity by applying ultraviolet radiation in the 200 nm to 300 nm range onto the luminescent component. The luminescent response is then determined which results from the applying of ultraviolet radiation. This resulting luminescent response may then be compared to a standard or known luminescent response from an article which is known to be authentic. Usually this may be done visually by an observer alone or with the aid of an instrument. An authentic article may have the luminescent component printed in a known pattern of indicia or on a known portion of the article or film, or a luminescent component with a specific spectral response may be used. An article is authentic if the expected response is observed and fails if the expected response is not observed.

The following Examples serve to illustrate the invention.

EXAMPLE 1

Lamination of Two Polymer Layers with an Adhesive Containing a Luminescent Component A Rohm & Haas polyurethane two-part adhesive, Adcote 444A with CR 100 epoxy base co-reactant, is used as the carrier adhesive for lamination of the polymer layers. Lumilux® Red CD 380 is a rare earth complex luminescent component. It is polar solvent-soluble, and can therefore dissolve in the adhesive system. It is excited by short UV light only (280 nm excitation maximum, negligible excitation above 300 nm).

A mixture is prepared comprising 50 parts Adcote 444A, 0.5 or 1.0 part CD380, 5 parts CR 100 co-reactant, and 27 parts water as diluent. The adhesive is then mixed under conventional methods for 10 minutes. This adhesive is then coated onto one of two polymer layers, and they are laminated together (e.g., 2 mil Aclar® or 10 mil PVC) using conventional coating/lamination methods including direct gravure, reverse roller, slot die, Meyer rod, and air knife systems.

Since PVC absorbs short wavelength UV light, no short UV can pass through the PVC layer, and no emitted fluorescent color is observed under this observation condition. Aclar® is UV transparent, which allows the CD 380 luminescent component to be excited by short UV light passing through the Aclar® layer, and to emit a bright red color when excited in this manner. When illuminated by long wavelength ultraviolet light through either polymer layer, no red fluorescent color is observed.

EXAMPLES 2-3

Preparation of Two Polymer Layers Laminated with an Adhesive Optionally Containing a Luminescent Component and Printed on the Laminate Side of Either or Both Layers with an Ink Containing a Luminescent Component

EXAMPLE 2

A fluorescent ink is prepared by mixing intimately with high shearing by spatulation on glass of 2 to 3 parts Lumilux® Red CD 380, a rare earth complex luminescent pigment for security coding, which is excited by short UV light only (280 nm excitation maximum, negligible excitation above 300 nm), with 8 to 7 parts Chromatic Technologies, Inc. Dynacolor™ Thermochromic Wet Offset Colorless ink. The resultant fluorescent ink is used to prepare an image-wise print on either a layer of 2 mil Aclar® or 10 mil PVC. In this example, the Red CD 380 image is printed on the PVC polymer layer using a Little Joe Offset Color Swatching Press, and a second, different image is printed on the PVC using a Little Joe Offset Color Swatching Press with an ink prepared with 2 to 3 parts of Lumilux® Yellow CD 382, a long and (weakly) short wavelength UV activated fluorescent salicylic acid derivative pigment which can be used for security coding, to 8 to 7 parts of Chromatic Technologies, Inc. Dynacolor™ Thermochromic Wet Offset Colorless ink.

A Rohm & Haas polyurethane two-part adhesive, Adcote 444A with CR 100 epoxy base co-reactant, is used as the carrier adhesive for lamination of the polymer layers. A mixture is prepared comprising 50 parts Adcote 444A, 5 parts CR 100 co-reactant, and 27 parts water as diluent. The adhesive is then mixed under conventional methods for 10 minutes. This adhesive is then coated onto one of two polymer layers (e.g., 2 mil Aclar® or 10 mil PVC), and they are laminated together using conventional lamination methods including direct gravure, reverse roller, slot die, Meyer rod, and air knife systems, with the printed fluorescent ink images on the laminated side of the PVC.

Since PVC absorbs short wavelength UV light, no short UV can pass through the PVC layer, and no emitted red, short-wavelength activated fluorescent color is observed under this condition; however, the long wavelength activated yellow fluorescent image is visible. Aclar® is UV transparent, which allows the CD 380 luminescent pigment to be excited by short UV light passing through the Aclar® layer, and to emit a bright red color; and the long wavelength UV activated yellow fluorescent image is also weakly visible. When the laminate is illuminated by long wavelength ultraviolet light through either polymer layer, no red fluorescent color is observed, but the yellow fluorescent image is visible.

EXAMPLE 3

A fluorescent ink is prepared by mixing intimately with high shearing by spatulation on glass of 2 to 3 parts Lumilux® Red CD 380, a rare earth complex luminescent pigment for security coding, which is excited by short UV light only (280 nm excitation maximum, negligible excitation above 300 nm), with 8 to 7 parts Chromatic Technologies, Inc. Dynacolor™ Thermochromic Wet Offset Colorless ink. The resultant fluorescent ink is used to prepare an image-wise print on either a layer of 2 mil Aclar® or 10 mil PVC. In this example, the Red CD 380 image is printed on the PVC polymer layer using a Little Joe Offset Color Swatching Press, and a second, different image is printed on the Aclar® using a Little Joe Offset Color Swatching Press with an ink prepared with 2 to 3 parts of Lumilux® Red CD 740, a long and (weakly) short wavelength UV activated fluorescent oxinate pigment which can be used for security coding, to 8 to 7 parts of Chromatic Technologies, Inc. Dynacolor™ Thermochromic Wet Offset Colorless ink.

Rohm & Haas polyurethane two-part adhesive, Adcote 444A with CR 100 epoxy base co-reactant, is used as the carrier adhesive for lamination of the polymer layers. A mixture is prepared comprising 50 parts Adcote 444A, 2 parts Lumilux® Green UC-2 an infrared activated rare-earth oxysulfide pigment which can be used for security coding, 5 parts CR 100 co-reactant, and 27 parts water as diluent. The adhesive is then mixed under conventional methods for 10 minutes. This adhesive is then coated onto one of two polymer layers (e.g., 2 mil Aclar® or 10 mil PVC), and they are laminated together using conventional lamination methods including direct gravure, reverse roller, slot die, Meyer rod, and air knife systems, with the printed fluorescent ink images on the laminated side of the polymer layers.

Since PVC absorbs short UV light, no short UV can pass through the PVC layer, and no emitted red, short-wavelength activated fluorescent color image is observed under this condition; however, the long and short wavelength UV activated red fluorescent image is (weakly) visible. Aclar® is UV transparent, which allows the CD 380 luminescent pigment ink image to be excited by short UV light passing through the Aclar® layer, and to emit a bright red color; and the long wavelength UV activated red fluorescent image is also visible. When the laminate is illuminated by long wavelength ultraviolet light through either polymer layer, no red fluorescent color is observed from the short wavelength activated fluorescent ink image, but the long wavelength activated fluorescent image is visible. When the laminate is illuminated by near infrared light through either polymer layer, no red fluorescent color is observed from either of the UV activated fluorescent ink images, but the infrared activated fluorescent material in the adhesive emits a visible green fluorescence.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A film comprising either i) or ii):
   i) a polymer layer containing a luminescent component therein, which luminescent component comprises a fluorescent substance and a phosphorescent substance, or comprises a mixture of at least one fluorescent substance and at least one phosphorescent substance, and which luminescent component luminesces upon the application of ultraviolet radiation in the 200 nm to 300 nm range onto the luminescent component; which polymer layer has a transparency to ultraviolet radiation in the 200 nm to 300 nm range in an amount of about 10% or more;
   ii) a) a polymer layer, which polymer layer has a transparency to ultraviolet radiation in the 200 nm to 300 nm range in an amount of about 10% or more; and
   b) a luminescent component on the polymer layer, which luminescent component comprises a fluorescent substance and a phosphorescent substance, or comprises a mixture of at least one fluorescent substance and at least one phosphorescent substance and which luminescent component luminesces upon the application of ultraviolet radiation in the 200 nm to 300 nm range onto the luminescent component.

2. The film of claim 1 comprising i) a polymer layer containing a luminescent component therein, which luminescent component comprises a fluorescent substance and a phosphorescent substance, or comprises a mixture of at least one fluorescent substance and at least one phosphorescent substance, and which luminescent component luminesces upon the application of ultraviolet radiation in the 200 nm to 300 nm range onto the luminescent component; which polymer layer has a transparency to ultraviolet radiation in the 200 nm to 300 nm range in an amount of about 10% or more.

3. The film of claim 1 comprising ii) a) a polymer layer, which polymer layer has a transparency to ultraviolet radiation in the 200 nm to 300 nm range in an amount of about 10% or more; and
   b) a luminescent component on the polymer layer, which luminescent component comprises a fluorescent substance and a phosphorescent substance, or comprises a mixture of at least one fluorescent substance and at least one phosphorescent substance, and which luminescent component luminesces upon the application of ultraviolet radiation in the 200 nm to 300 nm range onto the luminescent component.

4. The film of claim 3 wherein said luminescent component is combined with a binder.

5. The film of claim 4 wherein said binder comprises an adhesive.

6. The film of claim 4 wherein said binder comprises an aqueous adhesive.

7. The film of claim 4 wherein said binder comprises an ink.

8. The film of claim 1 wherein said polymer layer comprises a fluoropolymer.

9. The film of claim 1 wherein said polymer layer is selected from the group consisting of a chlorotrifluoroethylene homopolymer, a chlorotrifluoroethylene containing copolymer, an ethylene-chlorotrifluoroethylene copolymer, ethylene-tetrafluoroethylene copolymer, fluorinated ethylene-propylene copolymer, perfluoroalkoxyethylene, polychlorotrifluoroethylene, polytetrafluoroethylene, polyvinyl fluoride, polyvinylidene fluoride, and copolymers and blends thereof.

10. The film of claim 1 which comprises a plurality of different luminescent components, each of which luminescent components luminesce upon the application of ultraviolet radiation in the 200 nm to 300 nm range onto the components.

11. The film of claim 1 further comprising at least one receiver layer attached to said polymer layer.

12. The film of claim 3 further comprising at least one receiver layer attached to said polymer layer by an adhesive layer, and wherein said luminescent component is positioned between said polymer layer and said receiver layer.

13. The film of claim 11 wherein said receiver layer comprises a material selected from the group consisting of polyolefins, polyamides, ethylene vinyl acetate copolymers, ethylene vinyl alcohol copolymers, polyesters, polyethylene terephthalate, polyvinyl chloride, polyvinylidene chloride, polystyrene, styrenic copolymers, polyisoprene, polyurethanes, ethylene ethyl acrylate, ethylene acrylic acid copolymers, fluoropolymers, polyacrylics, polyalcohols, polyethers, polyketones, polycarbonates, polysulfides, cellulosic and polyvinyl derivatives, metal foils, papers, cardboards and combinations thereof.

14. The film of claim 11 wherein said receiver layer comprises polyvinyl chloride.

15. An article comprising the film of claim 1.

16. An article comprising the film of claim 11.

17. A blister package formed from the film of claim 1.

18. A blister package formed from the film of claim 11.

19. A process for forming a film comprising:
a) forming a blend of a luminescent component and a polymer, which luminescent component comprises a fluorescent substance and a phosphorescent substance, or comprises a mixture of at least one fluorescent substance and at least one phosphorescent substance, and which luminescent component luminesces upon the application of ultraviolet radiation in the 200 nm to 300 nm range onto the luminescent component; and
b) forming the blend into a polymer layer which polymer layer has a transparency to ultraviolet radiation in the 200 nm to 300 nm range in an amount of about 10% or more.

20. The process of claim 19 further comprising attaching a receiver layer to the polymer layer.

21. The process of claim 19 wherein said polymer comprises a fluoropolymer.

22. A process for forming a film comprising applying a luminescent component onto a polymer layer, wherein said polymer layer has a transparency to ultraviolet radiation in the 200 nm to 300 nm range in an amount of about 10% or more, which luminescent component comprises a fluorescent substance and a phosphorescent substance, or comprises a mixture of at least one fluorescent substance and at least one phosphorescent substance, and wherein said luminescent component luminesces upon the application of ultraviolet radiation in the 200 nm to 300 nm range onto the luminescent component.

23. The process of claim 22 further comprising attaching at least one receiver layer to said polymer layer, wherein said luminescent component is positioned between said polymer layer and said receiver layer.

24. The process of claim 22 wherein said polymer layer comprises a fluoropolymer.

25. The process of claim 22 wherein said luminescent component is combined with a binder.

26. The process of claim 22 wherein said binder comprises an adhesive.

27. The process of claim 22 wherein said luminescent component is present in the form of patterned indicia.

28. The process of claim 22 wherein said receiver layer comprises polyvinyl chloride.

29. An article comprising a multilayered film comprising either i) and iii or ii) and iii):
i) a fluoropolymer layer containing a luminescent component therein, which luminescent component comprises a fluorescent substance and a phosphorescent substance, or comprises a mixture of at least one fluorescent substance and at least one phosphorescent and which luminescent component luminesces upon the application of ultraviolet radiation in the 200 nm to 300 nm range onto the luminescent component; which fluoropolymer layer has a transparency to ultraviolet radiation in the 200 nm to 300 nm range in an amount of about 10% or more;
ii) a) a fluoropolymer layer, which fluoropolymer layer has a transparency to ultraviolet radiation in the 200 nm to 300 nm range in an amount of about 10% or more; and
b) a luminescent component on the fluoropolymer layer, which luminescent component comprises a fluorescent substance and a phosphorescent substance, or comprises a mixture of at least one fluorescent substance and at least one phosphorescent substance and which luminescent component luminesces upon the application of ultraviolet radiation in the 200 nm to 300 nm range onto the luminescent component;
iii) a receiver layer attached to said fluoropolymer layer, optionally by an adhesive layer.

30. The article of claim 29 which receiver layer is not transparent to ultraviolet radiation in the 200 nm to 300 nm wavelength range.

31. The article of claim 29 comprising i) a fluoropolymer layer containing a luminescent component therein, which luminescent component comprises a fluorescent substance and a phosphorescent substance, or comprises a mixture of at least one fluorescent substance and at least one phosphorescent substance and which luminescent component luminesces upon the application of ultraviolet radiation in the 200 nm to 300 nm range onto the luminescent component; which fluoropolymer layer has a transparency to ultraviolet radiation in the 200 nm to 300 nm range in an amount of about 10% or more.

32. The article of claim 29 comprising ii) a) a fluoropolymer layer, which fluoropolymer layer has a transparency to ultraviolet radiation in the 200 nm to 300 nm range in an amount of about 10% or more; and
b) a luminescent component on the fluoropolymer layer, which luminescent component comprises a fluorescent substance and a phosphorescent substance, or comprises a mixture of at least one fluorescent substance and at least one phosphorescent substance and which luminescent component luminesces upon the application of ultraviolet radiation in the 200 nm to 300 nm range onto the luminescent component.

33. The article of claim 32 wherein said wherein said luminescent component is positioned between said fluoropolymer layer and said receiver layer.

34. The article of claim 29 which comprises a shaped article for storing a product.

35. The article of claim 33 wherein said receiver layer is positioned to contact said product.

36. The article of claim 29 wherein said luminescent component is combined with a binder.

37. The article of claim 36 wherein said binder comprises an adhesive.

38. A method for authenticating an article comprising:
I. providing an article comprising a multilayered film comprising either i) and iii or ii) and iii):
   i) a fluoropolymer layer containing a luminescent component therein, which luminescent component comprises a fluorescent substance and a phosphorescent substance, or comprises a mixture of at least one fluorescent substance and at least one phosphorescent substance, and which luminescent component luminesces upon the application of ultraviolet radiation in the 200 nm to 300 nm range onto the luminescent component; which fluoropolymer layer has a transparency to ultraviolet radiation in the 200 nm to 300 nm range in an amount of about 10% or more;
   ii) a) a fluoropolymer layer, which fluoropolymer layer has a transparency to ultraviolet radiation in the 200 nm to 300 nm range in an amount of about 10% or more; and
      b) a luminescent component on the fluoropolymer layer, which luminescent component comprises a fluorescent substance and a phosphorescent substance, or comprises a mixture of at least one fluorescent substance and at least one phosphorescent substance, and which luminescent component luminesces upon the application of ultraviolet radiation in the 200 nm to 300 nm range onto the luminescent component;
   iii) a receiver layer attached to said fluoropolymer layer;
II) applying ultraviolet radiation in the 200 nm to 300 nm range onto the luminescent component;
III) determining a luminescent response resulting from the applying of ultraviolet radiation; and
IV) optionally comparing the luminescent response determined from step III) to a standard luminescent response.

39. The method of claim 38 wherein the luminescent component has been applied onto the receiver layer.

40. A process for forming a film comprising applying a luminescent component onto a receiver layer, which luminescent component comprises a fluorescent substance and a phosphorescent substance, or comprises a mixture of at least one fluorescent substance and at least one phosphorescent substance, and wherein said luminescent component luminesces upon the application of ultraviolet radiation in the 200 nm to 300 nm range onto the luminescent component, and then attaching a polymer layer to the receiver layer such that said luminescent component is positioned between said polymer layer and said receiver layer, wherein the polymer layer has a transparency to ultraviolet radiation in the 200 nm to 300 nm range in an amount of about 10% or more.

41. A film comprising:
   a) a polymer layer, which polymer layer has a transparency to ultraviolet radiation in the 200 nm to 300 nm range in an amount of about 10% or more; and
   b) a luminescent component on the polymer layer, which luminescent component comprises a fluorescent substance and which luminescent component luminesces upon the application of ultraviolet radiation in the 200 nm to 300 nm range onto the luminescent component; wherein said luminescent component is present in the form of patterned indicia.

42. The film of claim 41 wherein said luminescent component is combined with a binder.

43. The film of claim 42 wherein said binder comprises an adhesive.

44. The film of claim 42 wherein said binder comprises an ink.

45. The film of claim 42 wherein said binder comprises an aqueous adhesive.

46. The film of claim 41 wherein said polymer layer comprises a fluoropolymer.

47. The film of claim 41 wherein said luminescent component further comprises a phosphorescent substance or comprises a mixture of at least one fluorescent and at least one phosphorescent substance.

48. The film of claim 41 which comprises a plurality of different luminescent components, each of which luminescent components luminesce upon the application of ultraviolet radiation in the 200 nm to 300 nm range onto the components.

49. The film of claim 41 further comprising at least one receiver layer attached to said polymer layer, optionally by an adhesive layer, and wherein said luminescent component is positioned between said polymer layer and said receiver layer.

50. The film of claim 49 wherein said receiver layer comprises a material selected from the group consisting of polyolefins, polyamides, ethylene vinyl acetate copolymers, ethylene vinyl alcohol copolymers, polyesters, polyethylene terephthalate, polyvinyl chloride, polyvinylidene chloride, polystyrene, styrenic copolymers, polyisoprene, polyurethanes, ethylene ethyl acrylate, ethylene acrylic acid copolymers, fluoropolymers, polyacrylics, polyalcohols, polyethers, polyketones, polycarbonates, polysulfides, cellulosic and polyvinyl derivatives, metal foils, papers, cardboards and combinations thereof.

51. An article comprising the film of claim 41.

52. An article comprising the film of claim 49.

53. A blister package formed from the film of claim 49.

* * * * *